United States Patent
Miles et al.

(10) Patent No.: US 12,371,138 B2
(45) Date of Patent: Jul. 29, 2025

(54) RELOCATION BASED COVERAGE AREA ENHANCEMENT SYSTEM

(71) Applicant: Kyndryl, Inc., New York, NY (US)

(72) Inventors: Caleb Miles, Columbia, MO (US); Shikhar Kwatra, San Jose, CA (US); Vijay Ekambaram, Chennai (IN); Padmanabha Venkatagiri Seshadri, Mysore (IN)

(73) Assignee: Kyndryl, Inc., New York, NY (US)

( * ) Notice: Subject to any disclaimer, the term of this patent is extended or adjusted under 35 U.S.C. 154(b) by 433 days.

(21) Appl. No.: 17/826,989

(22) Filed: May 27, 2022

(65) Prior Publication Data

US 2023/0382507 A1 Nov. 30, 2023

(51) Int. Cl.
*B63H 9/072* (2020.01)
*B63B 79/10* (2020.01)
*G05D 1/461* (2024.01)
*G05D 109/20* (2024.01)

(52) U.S. Cl.
CPC ............. *B63H 9/072* (2020.02); *B63B 79/10* (2020.01); *G05D 1/461* (2024.01); *G05D 2109/27* (2024.01)

(58) Field of Classification Search
None
See application file for complete search history.

(56) References Cited

U.S. PATENT DOCUMENTS

| | | | |
|---|---|---|---|
| 6,918,346 | B2 | 7/2005 | Grenier |
| 11,649,142 | B2* | 5/2023 | Tran ...................... B66C 13/063 700/213 |
| 2011/0121570 | A1 | 5/2011 | Bevirt et al. |
| 2013/0062457 | A1* | 3/2013 | Deakin ..................... B64B 1/12 343/706 |
| 2020/0208607 | A1 | 7/2020 | Felker et al. |
| 2021/0129982 | A1 | 5/2021 | Collins et al. |

FOREIGN PATENT DOCUMENTS

| | | |
|---|---|---|
| AU | 2009202050 | 11/2011 |
| EP | 1373065 | 7/2006 |
| WO | 2018158576 | 9/2018 |

OTHER PUBLICATIONS

Mell et al., "The NIST Definition of Cloud Computing", NIST, Special Publication 800-145, Sep. 2011, 7 pages.
Mazur et al., "Clarity from above PwC global report on the commercial applications of drone technology", www.dronepoweredsolutions.com, May 2016, 40 pages.
Wood, "Global Drone Service Market Report 2019: Market is Expected to Grow from USD 4.4 Billion in 2018 to USD 63.6 Billion by 2025, at a CAGR of 55.9%", Press Release PR Newswire, Apr. 29, 2019, 7 pages.

* cited by examiner

*Primary Examiner* — Tamara L Weber
(74) *Attorney, Agent, or Firm* — Erik Swanson; Andrew M. Calderon; Calderon Safran & Wright P.C.

(57) ABSTRACT

A system includes: a platform; a payload extending from a platform; an adjustable tether connecting the payload to the platform; and a sail extending from the payload. The system further includes a computer program that is executable to relocate the platform to the area of interest based on a threshold based decision which may include providing a tether and sail configuration.

18 Claims, 5 Drawing Sheets

US 12,371,138 B2

RELOCATION BASED COVERAGE AREA ENHANCEMENT SYSTEM

BACKGROUND

Aspects of the present invention relate generally to a relocation based coverage area enhancement system and, more particularly, to a tethered relocation coverage enhancement system implemented with moving or stationary platforms.

Sensors are used in various analytics and IoT applications. These sensors may be mounted on stationary objects or on vehicles. The sensors mounted on stationary objects, e.g., poles, buildings, etc., may have a limited coverage area; whereas the sensors mounted on a vehicle may have a wider coverage area, they still may be limited by the exact location of the vehicle. Also, the deployment of the sensors may not be harnessing the most efficient energy sources to conserve energy.

SUMMARY

In a first aspect of the invention, a system comprises: a payload extending from a platform; an adjustable tether connecting the payload to the platform; and a sail extending from the payload.

In another aspect of the invention, there is a computer-implemented method including: estimating, by a computing device, an energy expended to move a payload to an area of interest; estimating, by the computing device, an energy expended to move to a location which could covers the area of interest with a certain sweep of the payload; estimating, by the computing device, an energy expended to perform the sweep given known environmental conditions; performing, by the computing device, a threshold based decision using the estimates; and relocating, by the computing device, the platform to the area of interest based on the threshold based decision.

In another aspect of the invention, there is a relocation based coverage area enhancement system and a processor, a computer readable memory, one or more computer readable storage media, and program instructions collectively stored on the one or more computer readable storage media. The program instructions are executable to: estimate an energy expended to move a payload of the relocation based coverage area enhancement system to an area of interest; estimate an energy expended to move the relocation based coverage area enhancement system to a location that covers the area of interest with a certain sweep of the payload; estimate an energy expended to perform the sweep given known environmental conditions; and relocate the payload to the area of interest based on the estimates.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to a relocation based coverage area enhancement system and, more particularly, to a tethered relocation coverage enhancement system implemented with moving or stationary platforms. According to more specific aspects of the invention, the tethered relocation based coverage enhancement system includes a tethered platform with a sail each of which are designed to enhance coverage area of a payload mounted onto the platform. In embodiments, the payload may be a sensor, radio unit (e.g., transceiver) actuator device, radar, etc. The tethered platform may also include intelligence capable of learning and combining environmental conditions and environmental patterns to enhance the coverage area for the particular payload. In this manner, implementations of the invention can harness environmental conditions to provide an ultra, low energy tethered sail relocation based coverage area enhancement strategy.

Figure 1:
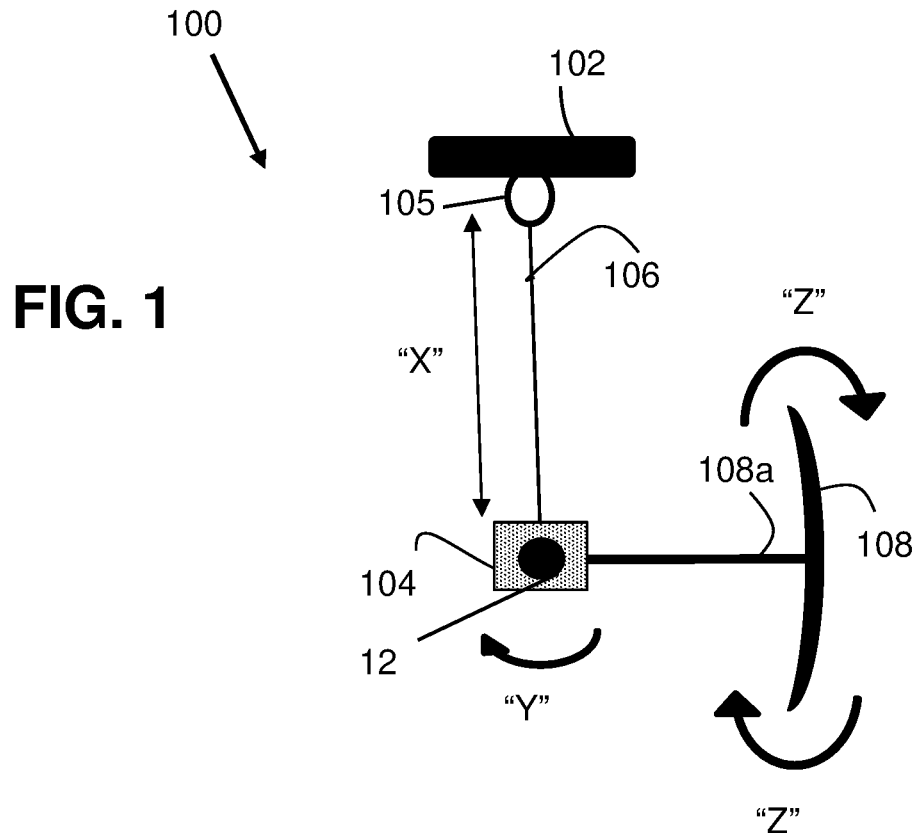
FIG. 1 shows a relocation based coverage area enhancement system in accordance with aspects of the present invention.

FIG. 1 shows a relocation based coverage enhancement system in accordance with aspects of the invention. In particular, the relocation based coverage enhancement system 100 includes a platform 102. In embodiments, the platform 102 may be a mobile platform or a stationary platform. For example, the mobile platform may be any type of vehicle, whereas the stationary platform may be mounted to pole, building, cellular tower or other structure.

A payload 104 is attached to the platform 102 by a tether 106. In embodiments, the payload 104 may be any type of payload (e.g., sensor or measuring device, radar system, radio unit, etc.). In more specific embodiments, the sensor may be a thermometer, wind speed gauge, air pollution monitor, etc. In embodiments, the tether 106 can be manufactured from any appropriate material (e.g., nylon cord or other synthetic material, steel, etc.) that is capable of supporting the payload 104 in different environmental conditions and various operational challenges. For example, the tether 106 is designed to withstand severe wind, rain, etc., while also supporting the weight and stresses applied by the payload 104.

The tether 106 is adjustable in length (e.g., can be lengthened and shortened depending on the specific task to be accomplished with the payload 104 as depicted by arrow "X"). In this way, the length of the tether 106 can be adjusted to control the sweep of the payload 104 (e.g., the movement of the payload as it hangs from the tether 106). As should be understood by those of skill in the art, the tether 106 can move in different directions and configurations (e.g., a pendulum movement, circular, paraboloid or parabola movements). In embodiments, the tether 106 can be adjusted (e.g., raveled or unraveled by a pulley system 105) to extend or retract the length of the tether and, hence, the adjust the coverage area of the payload 104. In alternative embodiments, the tether 106 can be adjusted by any appropriate servo motor as also depicted at reference numeral 105.

Still referring to FIG. 1, a sail 108 may be attached to the payload 104 and or a location on the tether 106. The sail 108 may be manufactured from any appropriate material that is appropriate to perform its functions in different environmental conditions and various operational challenges. In embodiments, the sail 108 alone, or in combination with the tether 106, functions to extend the range of the payload 104. For example, alone or in combination with the adjustment of the tether 106, the sail 104 may be used to harness the wind to move the payload 104 in a particular direction factoring in the oscillating reach it provides to the payload 104, as depicted by arrow "Y".

Figure 2:
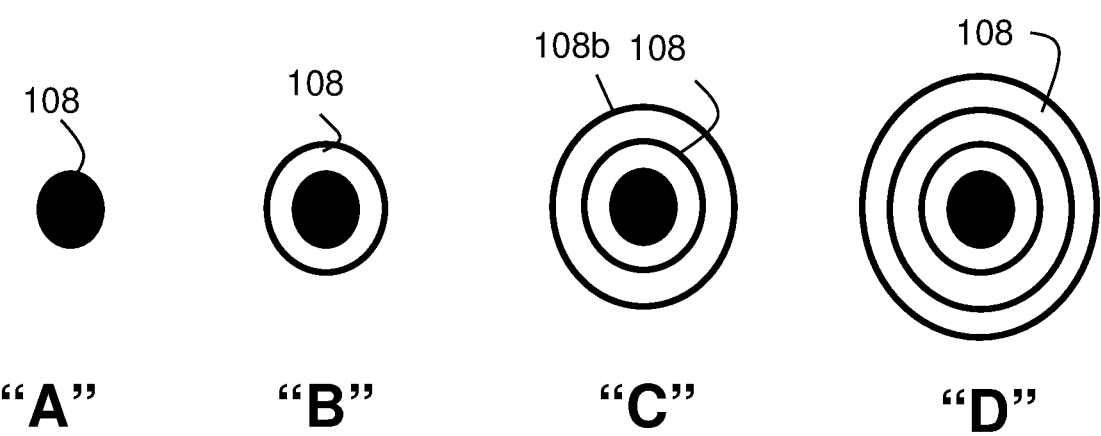
FIG. 2 shows several deployment configurations of a sail of the relocation based coverage area enhancement system in accordance with aspects of the present invention.

In further embodiments, the sail 108 can be adjustable in dimensional size as described in FIG. 2. By way of example, the sail 108 can be unfurled or furled-in to control the surface area required to catch wind. Similarly, a shaft 108a, which connects the sail 108 to the payload 104, can be rotated at the payload end or along its axis to adjust the sail orientation as depicted by arrows "Z". The shaft 108a can be adjusted by a servo motor or be mounted withing a bearing system to move freely by wind power, as examples. The sail 108 may also be moved across the horizontal and vertical axes to adjust for wind speeds.

FIG. 1 further shows a computing system 12 in accordance with aspects of the present invention. In embodiments, the computing system 12 may be a coverage unit that logs the epi-centers which were covered during the payload's sweep and the range that the payload operated from that epi-center. In embodiments, these parameters may be used as feedback for the processes to determine future sweeps or other adjustments. Moreover, the computing system 12 may further coordinate the configuration of the sail 108, shaft 108a and the tether 106. In this way, the computing system 12 may be used to configure different sweeps or coverage areas. Moreover, the computing system may coordinate with other systems (e.g., relocation based coverage enhancement system) to coordinate efforts for additional coverage areas.

As discussed in more detail herein, the computing system 12 may determine or estimate the energy expended to move to an area of interest, the energy expended to move to a favorable location which could cover the area of interest with a sweep, and the energy expended to perform the sweep given certain environmental conditions. The computing system 12 may also apply a pendulum model (or parabola or paraboloid) and sail model to estimate an aggregate sweep area (aggregate of sectors of a circle negotiated by the pendulum or other shaped configuration). In addition, the computing system 12 may determine and provide instructions to relocate the moving platform, estimate an optimal tether-sail configuration, deploy the tether-sail in the optimal configuration and construct a multi-modal situation picture of the desired coverage.

FIG. 2 shows a sail 108 in different furled configurations. In particular, FIG. 2 shows the sail in different unfurled configurations, with "A" denoting the sail 108 in a completely furled configuration and "D" denoting the sail 108 in a completely unfurled configuration. In addition, "B" and "C" show the sail 108 in intermediate unfurled configurations. In embodiments, the sail 108 may include a plurality of ribs 108b. In embodiments, the ribs 108b may be held together by electro-magnets which can be controlled so that neighboring ribs can be released as the surface area needs to be increased. Alternatively, the ribs 108b can be furled and unfurled by any appropriate servo motor which may be controlled by the computing system 12.

In embodiments, the computer system 12 (e.g., coverage unit and/or control system) may provide its functionality as a system, a method, and/or a computer program product. Accordingly, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
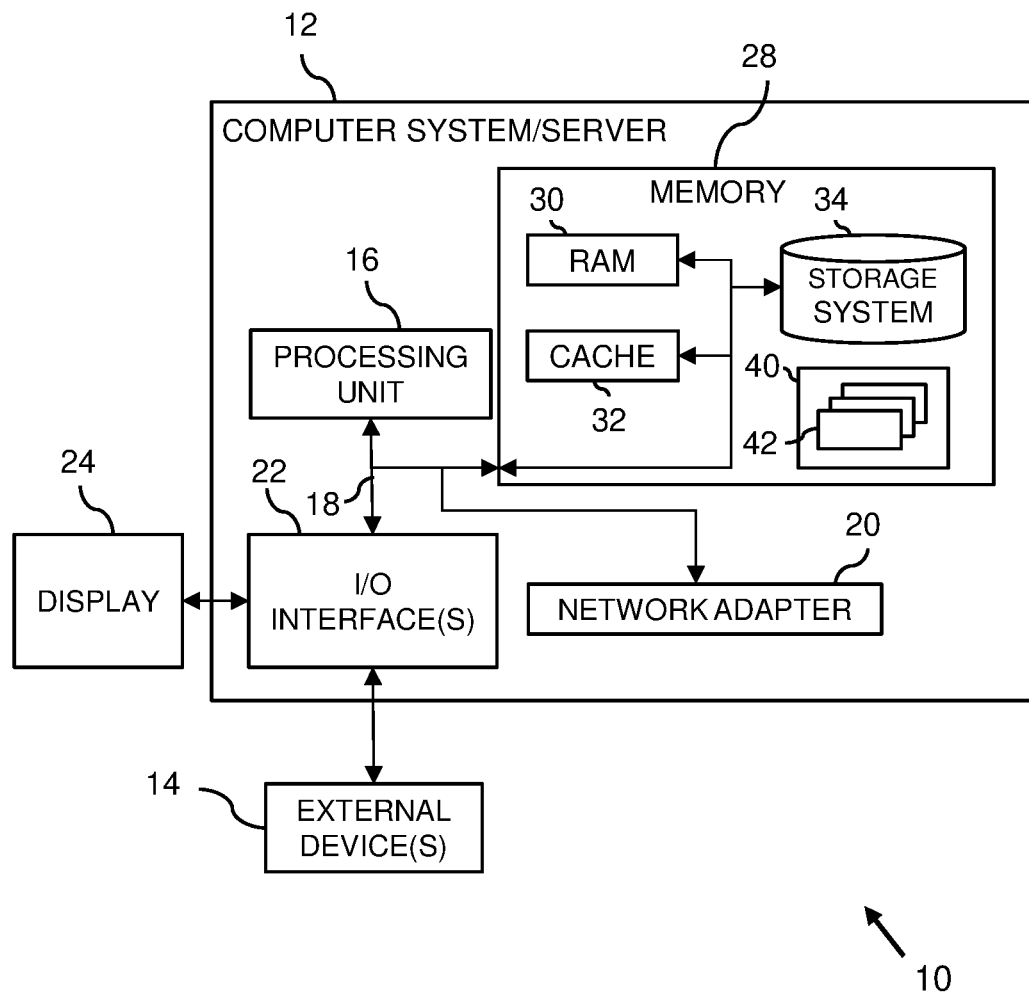
FIG. 3 depicts a cloud computing node according to an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
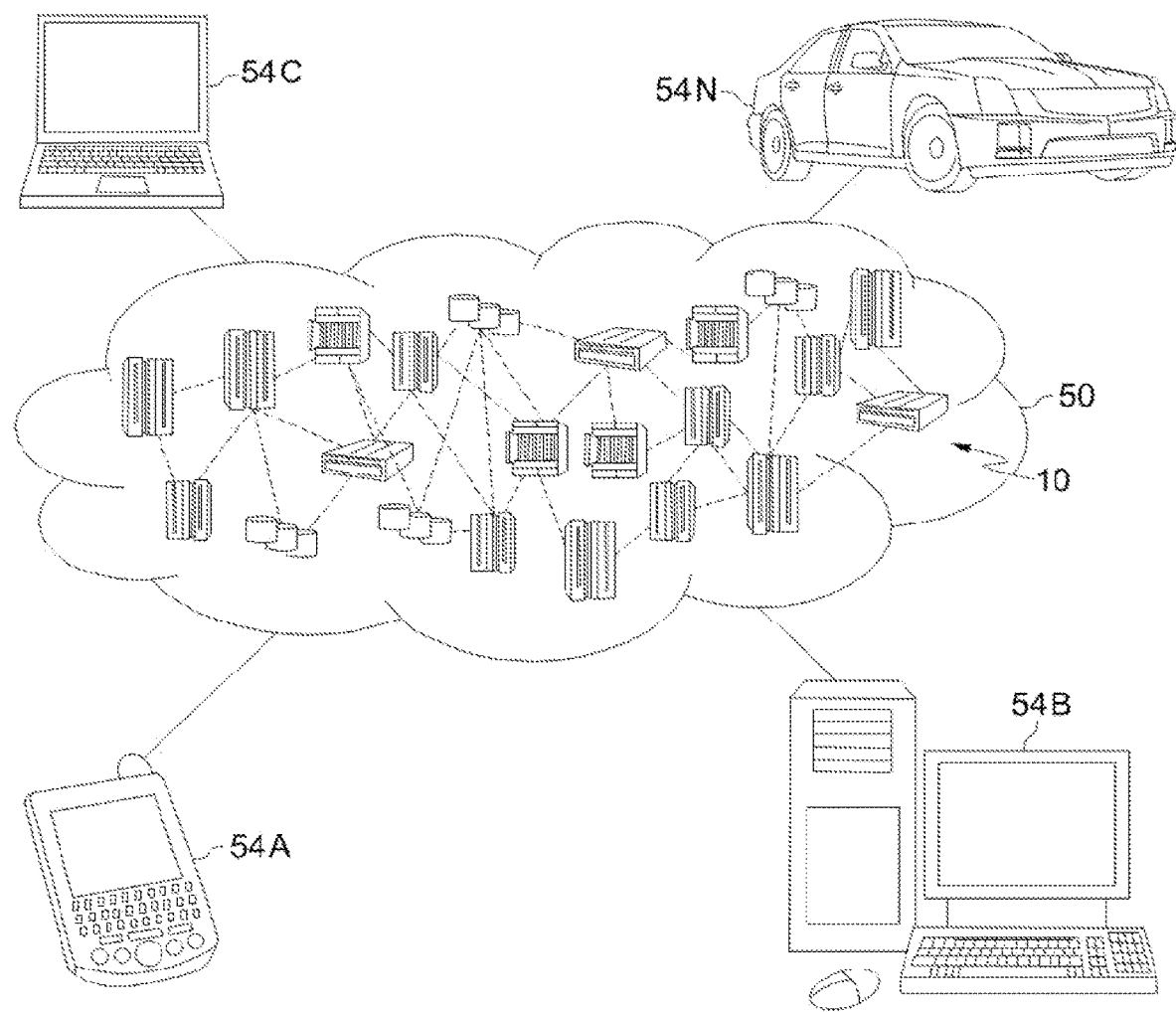
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 5:
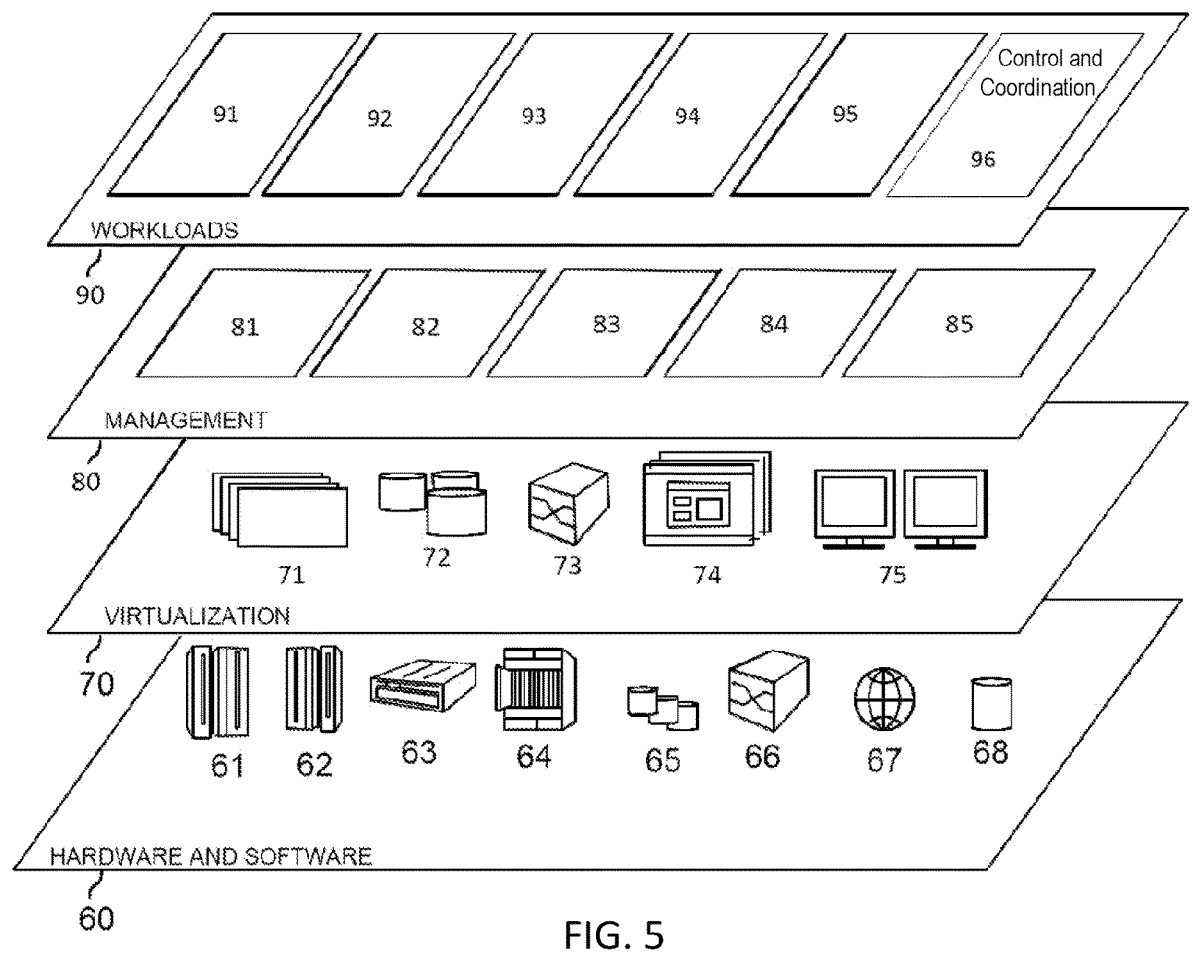
FIG. 5 depicts abstraction model layers according to an embodiment of the present invention.

Referring now to FIG. 5, a set of functional abstraction layers provided by cloud computing environment 50 (FIG. 2) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and control and coordination 96.

Implementations of the invention may include a computer system/server 12 of FIG. 3 in which one or more of the program modules 42 are configured to perform (or cause the computer system/server 12 to perform) one of more functions of the control and coordination 96 of FIG. 3. For example, the one or more of the program modules 42 may be configured to:

(i) estimate the energy expended to move to an area of interest;
(ii) estimate the energy expended to move to a favorable location which could cover the area of interest with a certain sweep;
(iii) estimate the energy expended to perform the sweep given the environmental conditions;
(iv) apply pendulum (or other shape) and sail models to estimate the aggregate sweep area;
(v) perform a threshold based decision;
(vi) relocate the platform to an area of interest;
(vii) estimate the tether and sail configuration which involves the sequence of movements at all degrees of freedom;
(viii) deploy a tether-sail configuration; and
(ix) construct a multi-modal situation picture.

Figure 6:
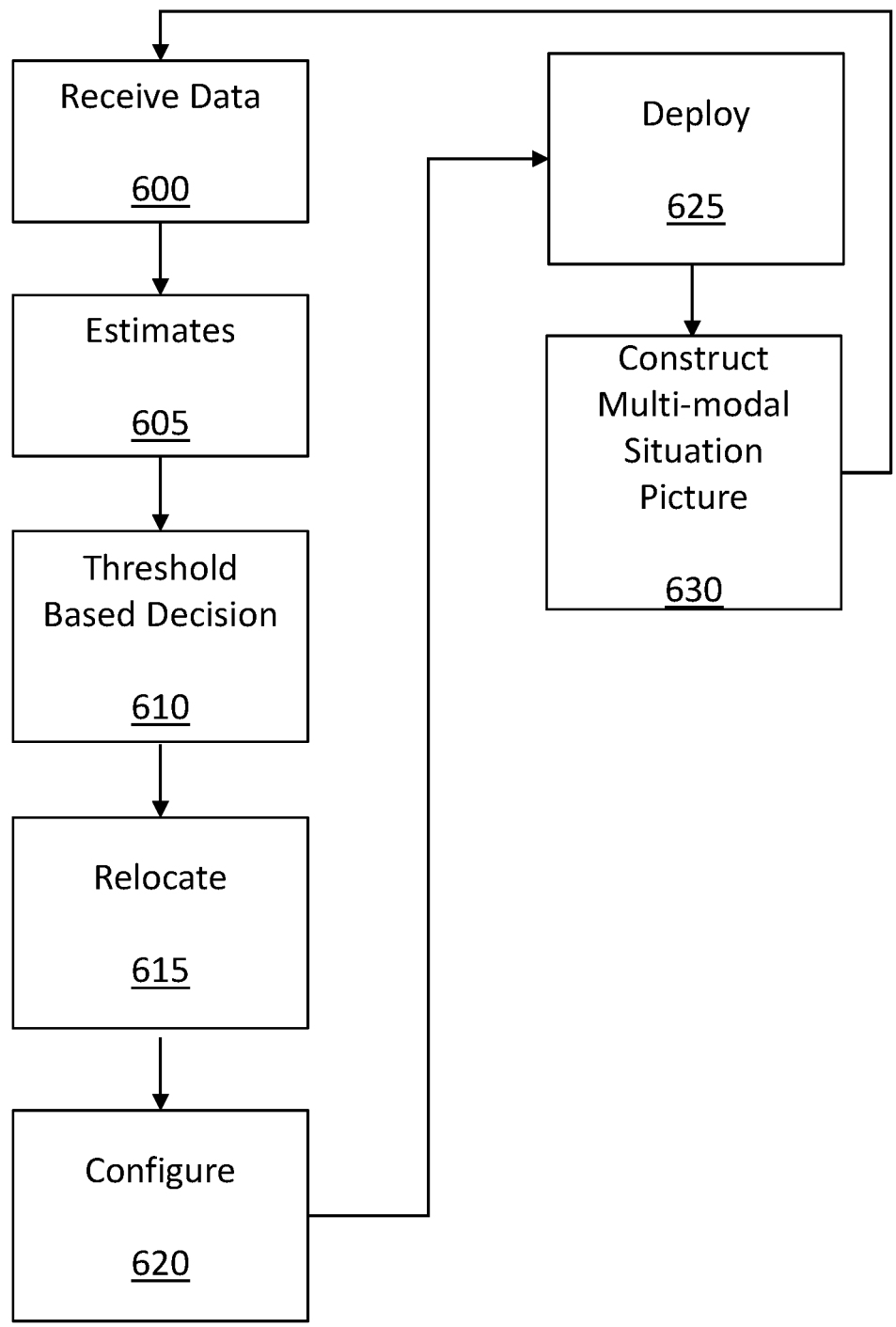
FIG. 6 shows a flowchart of an exemplary method in accordance with aspects of the invention.

FIG. 6 shows a flow diagram of exemplary processes in accordance with aspects of the invention. Steps of the method may be carried out in the environment of FIGS. 1 and 3, and are described with reference to elements depicted in FIG. 1.

In embodiments, the process flow starts at step 600. For example, at step 600, certain data is received (or provided) by the system. This data may include, for example, an available energy budget, an area-of-interest, action to be taken, e.g., nature of sensing, communication or actuation at the area-of-interest, feedback including past coverage areas achieved in the given area-of-interest and environmental conditions. In embodiments, the environmental conditions may be wind speed and direction at a given altitude and location, turbulence, humidity and temperature. These environmental conditions can be obtained from any open source or proprietary systems as should be known in the art such that no further explanation is required for a complete understanding of the present invention.

At step 605, the system may decide a deployment modality by generating (e.g., calculating) certain estimates. These estimates may include, e.g., (i) the energy expended to move to an area of interest ($E_{full-relocate}$), (ii) the energy expended to move to a favorable location which could cover the area of interest with a certain designed sweep ($E_{partial-relocate}$) and (iii) the energy expended to perform the sweep given the environmental conditions listed above and by applying a particular pendulum or other geometric model and sail model to estimate the aggregate sweep area of the payload 104 (aggregate of sectors of a circle negotiated by the pendulum) ($E_{sweep}$).

In embodiments and as should be understood by those of skill in the art, a pendulum model may include the following parameters: (m) mass of the pendulum bar (e.g., tether 106); (M) mass of the pendulum end weight (e.g., payload 104); (l) length to end weight center of mass; and (theta)pendulum angle from vertical (down). Using these parameters, an example model may be:

$$-(M+m)gl_G \sin\theta - b\dot\theta = I_O \ddot\theta$$

See, e.g., Control Tutorials for Matlab & Similink, Activity 3: Modelling of a Simple Pendulum http://ctms.engin.umich.edu/CTMS/index.php?aux=Activities_Pendulum.

In addition, the sail model may be provided by mathematical models known to those of skill in the art. For example, a known sail model may be found at Johan Hoffman et al., Mathematical Theory of Sailing, http://www.csc.kth.se/~cgjoh/theoryofsailing.pdf, 2009.

At step 610, the system performs a threshold based decision. By way of example illustration:

If: $E_{full-relocate} - E_{sweep}$ > ThresholdForSweeping: Perform sweep-only.

ElseIf: $E_{full-relocate} - E_{partial-relocate} + E_{sweep}$ > ThresholdForHybrid: Perform partial-relocate+sweep.

ElseIf: $E_{full-relocate} - E_{sweep}$ > ThresholdForRelocate: Perform full-relocate.

Else: Ask peer platforms to perform relocate and sweep.

At step 615, for a moving platform configuration, the system may relocate the platform based on the decisions made at step 610. For example, this step may include moving the platform fully or partially to an area of interest.

At step 620, the system estimates tether-sail configuration based on the decision made at step 610. For example, the system may estimate the tether and sail configuration which involves the sequence of movements at all degrees of freedom, e.g., length of the tether 106, a certain surface area of the sail 108 (furl or unfurl the sail 108), orientation of the sail 108 and the shaft 108*a* to catch the appropriate wind force, etc.

At step 625, the system may deploy the tether and/or sail configuration. This may include unraveling or winding up the tether 106 in order to extend or reduce the length at the other end of which is the payload 104.

At step 630, the system may construct a multi-modal situation picture. For example, in this step, sensors may be used to estimate the environmental conditions and log the points covered by the sweep. Using these values, a map may be created on covered parts of the area-of-interest over time. The map and the environmental conditions may be reported back to the system for use at step 600, for use in calculating and/or for estimating the deployment posture of the system for future sweeps.

In embodiments, a service provider could offer to perform the processes described herein. In this case, the service provider can create, maintain, deploy, support, etc., the computer infrastructure that performs the process steps of the invention for one or more customers. These customers may be, for example, a data information business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a payload extending from a platform;
   an adjustable tether connecting the payload to the platform;
   a sail extending from the payload; and
   a computing device comprising a processor configured to:
   estimate an energy expended to move the payload to an area of interest;
   estimate an energy expended to move to a location which covers the area of interest with a certain sweep of the payload;
   estimate an energy expended to perform the certain sweep given known environmental conditions;
   perform a threshold based decision using the estimates; and
   relocate the platform to the area of interest based on the threshold based decision.

2. The system of claim 1, wherein the payload comprises a sensor.

3. The system of claim 1, further comprising a pulley system configured to adjust a length of the tether and an adjustable shaft connecting to the sail.

4. The system of claim 1, wherein the sail is configured to furl and unfurl to decrease and increase a surface area, respectively, of the sail.

5. The system of claim 1, wherein the processor is further configured to control an area of coverage of the payload.

6. The system of claim 1, wherein the processor is further configured to estimate a tether and sail configuration which involves a sequence of movements at all degrees of freedom.

7. The system of claim 6, wherein the processor is further configured to deploy the tether and sail configuration based on the estimate of the tether and sail configuration.

8. The system of claim 1, wherein the threshold based decision comprises:

If: $E_{full-relocate} - E_{sweep}$ > ThresholdForSweeping: Perform sweep-only;

ElseIf: $E_{full-relocate} - E_{partial-relocate} + E_{sweep}$ > ThresholdForHybrid: Perform partial-relocate+sweep;

ElseIf: $E_{full-relocate} - E_{sweep}$ > ThresholdForRelocate: Perform full-relocate; and Else: Ask peer platforms to perform relocate and sweep, wherein $E_{full-relocate}$ is the energy expended to move the payload to the area of interest, $E_{partial-relocate}$ is the energy expended to move to the location which covers the area of interest with a certain designed sweep, and $E_{sweep}$ is the energy expended to perform the sweep given certain environmental conditions and by applying a particular model to estimate an aggregate sweep area of the payload.

9. The system of claim 8, wherein the particular model includes a sail model and a geometric model of a sweep movement of the tether.

10. The system of claim 8, further comprising providing a multi-modal situation picture of a desired coverage which is fed back into the computing device and used to provide the estimates.

11. A method comprising:
estimating, by a computing device, an energy expended to move a payload to an area of interest, wherein the payload extends from a platform;
estimating, by the computing device, an energy expended to move to a location which covers the area of interest with a certain sweep of the payload;
estimating, by the computing device, an energy expended to perform the certain sweep given known environmental conditions;
performing, by the computing device, a threshold based decision using the estimates; and
relocating, by the computing device, the platform to the area of interest based on the threshold based decision.

12. The method of claim 11, further comprising estimating, by the computing device, a tether and sail configuration which involves a sequence of movements at all degrees of freedom.

13. The method of claim 12, further comprising deploying the tether and sail configuration based on the estimate of the tether and sail configuration.

14. The method of claim 11, wherein the threshold based decision comprises:
If: $E_{full-relocate} - E_{sweep} >$ ThresholdForSweeping: Perform sweep-only;
ElseIf: $E_{full-relocate} - E_{partial-relocate} + E_{sweep} >$ ThresholdForHybrid: Perform partial-relocate+sweep;
ElseIf: $E_{full-relocate} - E_{sweep} >$ ThresholdForRelocate: Perform full-relocate; and
Else: Ask peer platforms to perform relocate and sweep, wherein $E_{full-relocate}$ is the energy expended to move to the area of interest, $E_{partial-relocate}$ is the energy expended to move to the location which covers the area of interest with a certain designed sweep, and $E_{sweep}$ is the energy expended to perform the sweep given certain environmental conditions and by applying a model to estimate an aggregate sweep area of the payload.

15. The method of claim 14, wherein the model includes a sail model and a geometric model of a sweep movement of a tether.

16. The method of claim 14, further comprising providing multi-modal situation picture of a desired coverage which is fed back into the computing device and used to provide the estimates.

17. A system comprising:
a relocation based coverage area enhancement system comprising a payload attached to a platform; and
a processor, a computer readable memory, one or more computer readable storage media, and program instructions collectively stored on the one or more computer readable storage media, the program instructions executable to:
estimate an energy expended to move a payload of the relocation based coverage area enhancement system to an area of interest;
estimate an energy expended to move the relocation based coverage area enhancement system to a location that covers the area of interest with a certain sweep of the payload;
estimate an energy expended to perform the certain sweep given known environmental conditions; and
relocate the payload to the area of interest based on the estimates.

18. The system of claim 17, wherein the relocation based coverage area enhancement system comprising a configurable sail attached to a retractable tether, the payload being attached to the retractable tether.

* * * * *